INTERCOMMUNICATION TEST SET
Filed Jan. 7, 1966
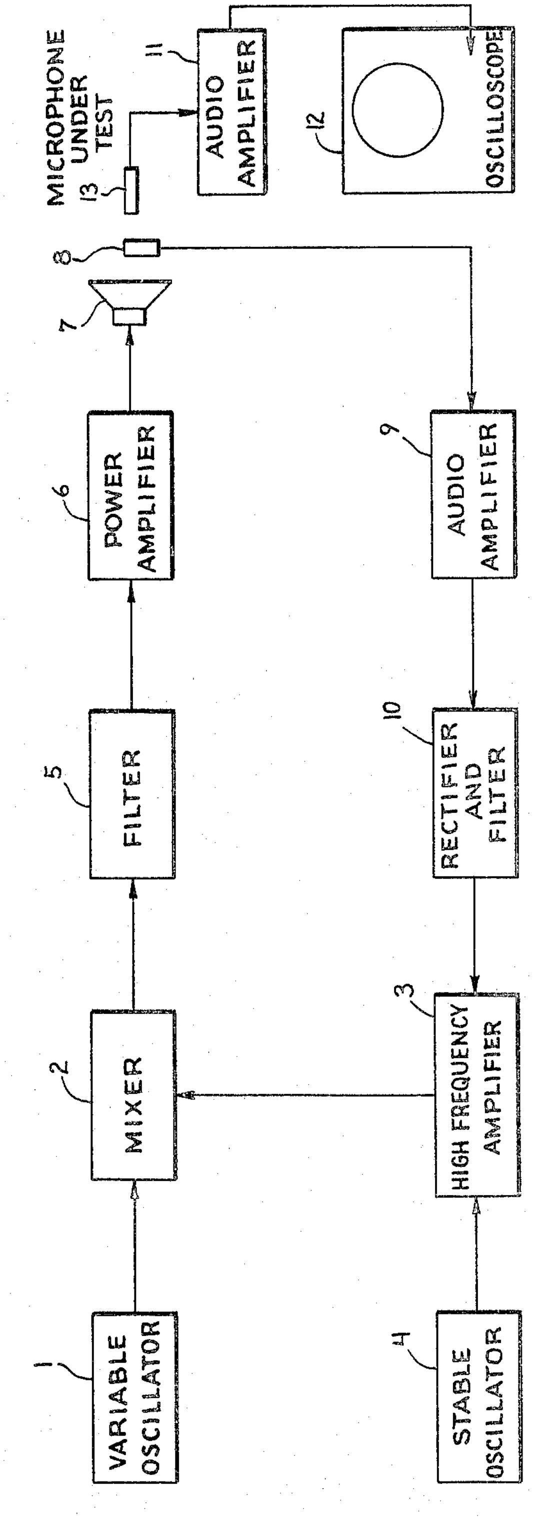
*INVENTORS.*
BILLY B. CHIPP and
MICKEY H. KINKADE
H. H. Locke
ATT'YS.

3,267,222
INTERCOMMUNICATION TEST SET
Billy B. Chipp, Ridgecrest, Calif., and Mickey H. Kinkade, Indianapolis, Ind., assignors to the United States of America as represented by the Secretary of the Navy
Filed Jan. 7, 1966, Ser. No. 519,394
1 Claim. (Cl. 179—175.1)

The invention described herein may be manufactured and used by or for the Government of the United States of America for governmental purposes without the payment of any royalties thereon or therefor.

This invention relates to microphone testing devices and more particularly to a constant amplitude source of sound to be used in obtaining frequency response data of a microphone.

A meaningful test for a close-talking microphone, such as that used on a pilot's helmet, is to determine whether its electrical output is constant in amplitude over the frequency band of the voice; and, whether an undistorted sine-wave sound input produces an undistorted sine-wave voltage output. It is desirable, especially for military applications, that this test be performed by a small and self-sufficient unit. Therefore, a general object of this invention is to provide a compact microphone testing device employing a variable-frequency constant-amplitude distortion-free sound source.

Various other objects and advantages will appear from the following description of one embodiment of the invention, which is shown in a single figure as a block circuit diagram with signal information passing in the direction of the conductor arrows, and the novel features will be particularly pointed out hereinafter in connection with the appended claim.

Referring to the figure of the drawing, there is shown a variable oscillator 1 with its output coupled as one input of a frequency mixer circuit 2. Coupled as a second mixer input is the output of an amplifier 3 which is fed by a crystal controlled or stable oscillator 4. Both oscillators, 1 and 4, are high-frequency oscillators and when their frequencies are mixed by the mixer circuit 2, a difference frequency results which is in the audio range. The variable oscillator 1 may be a modified Clapp oscillator with a variable capacitor for changing the output frequency. A reasonable design would be to make the oscillator 1 variable between 95 kilocycles (kc.) and 99.5 kc. and to design the stable oscillator 4 for 100 kc., although other frequency values may be utilized without departing from the spirit and intent of this invention. Among the frequencies which will then be present at the mixer output are the sum and difference frequencies of the two oscillators. It is seen that as the frequency of oscillator 1 is varied between its extremes, the difference frequency at the mixer output will vary between the limits of 500 cycles per second (c.p.s.) and 5,000 c.p.s. A low pass filter 5 is coupled between the mixer circuit 2 and a power amplifier 6 which drives a transducer 7 which may be a very small speaker with a distortion free output across the required frequency variation. Speakers with these qualities are not available with the additional requirement of a flat frequency response curve. This means that when a signal of varying frequency but constant amplitude is fed to the speaker, the sound produced will vary in both frequency and amplitude. To hold the amplitude constant a feedback circuit is employed comprising a monitoring microphone 8, an audio amplifier 9, and a rectifier and filter circuit 10. It is obviously desirable for the monitoring microphone 8 to have a flat frequency response curve and a condenser microphone satisfies this requirement. In making the feedback circuit most effective it is necessary that the condenser microphone 8 be placed in close proximity to the speaker 7. The least amount of distortion is caused when a microphone 13 under test is placed in a direct line from the speaker 7, or in the zero degree plane with the speaker, and the monitoring microphone 8 is placed perpendicular to a line from the center of the speaker 7, or in the 90 degree plane with the speaker. This manner of microphone placement is illustrated in the drawing. Both microphones should be in close proximity to the speaker 7 in order to minimize the interference from other sources of sound. The microphone 13 under test is coupled to an amplifier 11 which has its output coupled to an oscilloscope 12. During a test, the oscilloscope shows any change in the output waveform of the microphone under test. Therefore, both amplitude change and distortion, of the output signal of the microphone under test, may be monitored simultaneously while varying the frequency of the constant amplitude sound source.

In the operation of the invention, the monitoring microphone 8 converts the sound energy from the transducer 7 to a voltage, and this voltage is applied to the audio amplifier 9. The output signal of the audio amplifier 9 is coupled to the rectifier and filter circuit 10 where it is converted to a ripple free direct current (D.C.) voltage and applied as D.C. bias to the high frequency amplifier 4. This bias controls the gain of the high frequency amplifier; and therefore, the amplitude of the signal from the stable oscillator is caused to increase when the amplitude of the sound source decreases and vice versa. If the amplitude of the stable frequency voltage to the mixer increases, the audio signal to the transducer increases and thereby stabilizes the output amplitude of the transducer.

This invention employs a number of known devices which, when coupled together as taught in this specification, provide a novel combination which is compact and functional. It will be understood that various changes in the details, which have been herein described and illustrated in order to explain the nature of the invention, may be made by those skilled in the art within the principle and scope of the invention and we desire to be limited only in the scope of the appended claim.

We claim:

A compact variable-frequency constant-amplitude sound source for use in testing close-talking microphones wherein a microphone under test is coupled to an audio amplifier which is coupled to the vertical input of an oscilloscope whereby an operator may watch the oscilloscope for microphone signal distortion, and for variations in signal amplitude, while he varies the frequency of the sound source, said sound source comprising:

- a frequency mixing means having a first input, a second input, and an output;
- a variable frequency oscillating means having its output coupled to said first input of said mixing means;
- a stable-frequency oscillating means;
- a high-frequency amplifying means having a signal input, a direct current bias input, and an output, said signal input being coupled to the output of said stable oscillating means, and said output of said high-frequency amplifying means being coupled to said second input of said mixing means;
- a filter having its input coupled to said output of said mixing means for the purpose of filtering out all high frequency signals from said mixing means and passing only the audio frequency signals;
- a transducing means, to convert electrical signals to sound waves having a distortion free output across the frequency range of the test;
- a power amplifying means having its input coupled to the output of said filter, and having its output coupled to the input of said transducing means;

a monitoring microphone placed in close proximity to said transducing means and to the microphone under test, said monitoring microphone having a flat frequency response over the frequency range of the microphone under test, said monitoring microphone mounted in the 90 degree plane with respect to said transducing means;

a feedback audio amplifier having its input coupled to the output of said monitoring microphone; and a rectifying and filtering means having its input coupled to the output of said feedback audio amplifier and having its output coupled to said direct current bias input of said high frequency amplifying means whereby a constant-amplitude sound source is produced by the transducing means since any change in output sound level is used as negative feedback to the frequency source, to return the sound signal to its normal level by changing the direct current bias to the high frequency amplifying means, thereby changing its gain and controlling the amplitude of the stable oscillator signal to the mixing means, whereupon the audio frequency mixer output is filtered and then amplified by said power amplifier which drives said transducing means.

References Cited by the Applicant

UNITED STATES PATENTS

| | | |
|---|---|---|
| 2,224,909 | 12/1940 | Hackley. |
| 2,530,383 | 11/1950 | Estes et al. |
| 3,093,711 | 6/1963 | Comerci et al. |

KATHLEEN H. CLAFFY, *Primary Examiner.*

F. N. CARTEN, *Assistant Examiner.*